(12) United States Patent
Bush

(10) Patent No.: US 8,365,345 B1
(45) Date of Patent: Feb. 5, 2013

(54) WINDSHIELD WIPER LIFTER

(76) Inventor: Nathan Bush, Bokeelia, FL (US)

( * ) Notice: Subject to any disclaimer, the term of this patent is extended or adjusted under 35 U.S.C. 154(b) by 0 days.

(21) Appl. No.: 13/217,192

(22) Filed: Aug. 24, 2011

(51) Int. Cl.
*B60S 1/04* (2006.01)
*B60S 1/34* (2006.01)

(52) U.S. Cl. .............. 15/250.19; 15/250.001; 15/257.01

(58) Field of Classification Search ............. 15/250.001, 15/250.19, 250.351, 257.01, 250.16, 250.202
See application file for complete search history.

(56) References Cited

U.S. PATENT DOCUMENTS

| | | | | |
|---|---|---|---|---|
| 5,551,116 | A * | 9/1996 | DeKelaita | 15/250.19 |
| 5,628,084 | A * | 5/1997 | Chen | 15/250.19 |
| 7,703,169 | B2 * | 4/2010 | Cakmak | 15/250.19 |
| 2003/0221275 | A1 * | 12/2003 | Shih | 15/250.19 |

FOREIGN PATENT DOCUMENTS

| | | | |
|---|---|---|---|
| DE | 3325707 | * | 1/1985 |
| FR | 2621876 | * | 4/1989 |

* cited by examiner

*Primary Examiner* — Gary Graham
(74) *Attorney, Agent, or Firm* — Christopher J. Vandam, PA; Chris Vandam

(57) ABSTRACT

The present invention is a windshield wiper lifter that mounts to a standard vehicle windshield wiper arm. The windshield wiper lifter has an articulating arm affixed approximately perpendicular to the windshield wiper. A first block and a second block are affixed to the windshield in the arced path of the windshield wiper lifter. When the windshield wiper lifter strikes the first block it raises the wiper arm off of the windshield when the wiper arm strokes in a first direction. When the windshield wiper lifter strikes the second block it lowers the windshield wiper arm when stroking in a second direction.

3 Claims, 3 Drawing Sheets

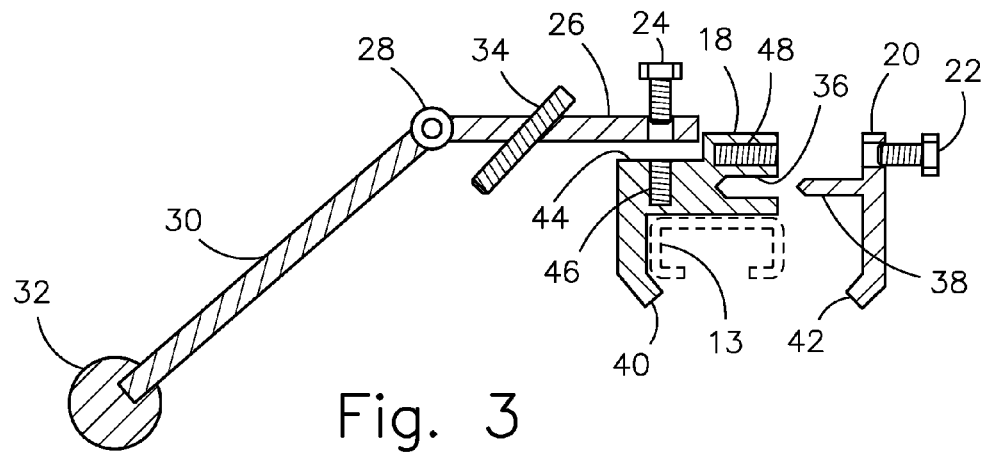
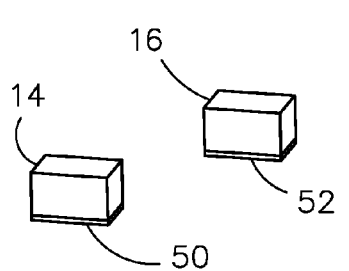
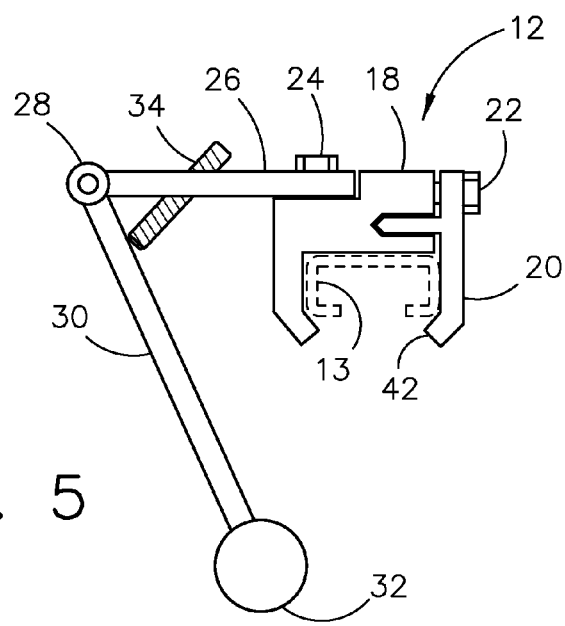

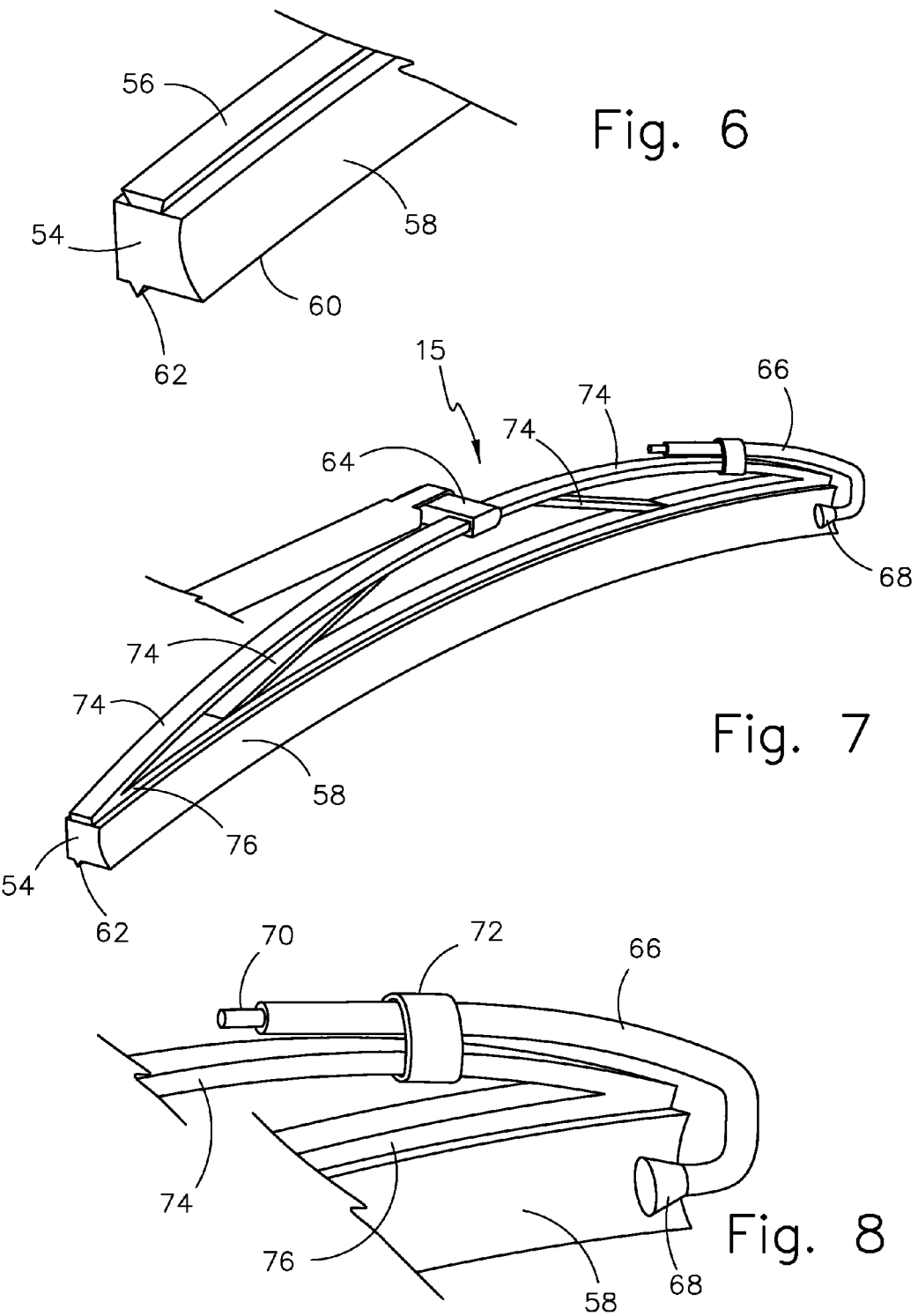

WINDSHIELD WIPER LIFTER

BACKGROUND OF THE INVENTION

1. Field of the Invention

The present invention relates to vehicle windshield wipers, and more particularly, to an improved windshield wiper suited for rapid removal of debris obstructing the occupants' view through the windshield of a motor vehicle.

2. Description of the Related Art

Several designs for windshield wipers have been designed in the past. None of them, however, include an elegant mechanism to lift the windshield wiper blade off of the windshield during the return stroke while providing an advantageous blade profile to remove debris efficiently from the windshield and yet remain easily attachable to a vehicle and removable without significant modifications.

Applicant believes that the closest reference corresponds to U.S. Pat. No. 5,551,116 issued to DeKalaita. However, it differs from the present invention because although DeKalaita has an assembly affixed to the windshield of a vehicle that interacts with a corresponding assembly on the wiper blade arm it fails to hold the arm off the windshield for the entire return stroke while allowing the blade to contact the windshield on the outboard stroke. DeKalaita in designed to knock debris from the wiper blade itself rather than providing a means to directly more effectively wipe the windshield.

In contrast to DeKalaita, the present invention will, in addition to clearing a debris-covered blade by knocking it on the windshield, it also acts to push debris accumulated on the windshield only away towards the side of the vehicle thereby greatly increasing the performance of the windshield wiper.

Further, the present invention includes variants that further distinguish it from the prior art by provided a complementary wiper blade profile, allow the device to be easily removable from the vehicle when not needed and has a fluid flushing capability, among other improvements and differences.

Other patents describing the closest subject matter provide for a number of more or less complicated features that fail to solve the problem in an efficient and economical way. None of these patents suggest the novel features of the present invention.

SUMMARY OF THE INVENTION

Traditional, common art automotive type windshield wipers are most effective when used during liquid rain environmental conditions. Their effectiveness sharply declines when used to clear windshields of sleet, snow, mud and other viscous substances.

The current windshield wiper art on most vehicles comprises a wiper arm and blade that contacts the windshield. The blade moves in short arcs back and forth across the windshield. This motion tends to smear viscous debris on the glass and thereby dangerously obscures the vision of the operator.

Some vehicles are exposed to conditions that are not commonly experienced by vehicles used on paved roads. For example, off-road trucks, "bush" planes, farm equipment, construction equipment and other vehicles used in un-paved conditions. It is important to maintain an unobstructed clear line of sign through the windshield to maintain safe operations of the vehicle.

It is one of the main objects of the present invention to provide a windshield wiper capable of effectively clearing a windshield of difficult to remove debris such as mud, heavy precipitation or other dangerous conditions.

It is another object of this invention to provide a windshield wiper that greatly limits the possibility of scratching windshield glass and glass coatings thereby preserving the transparency of the windshield and safe operation of the vehicle.

It is still another object of the present invention to provide a windshield wiper that greatly reduces smearing of any foreign substances, such as mud or sleet, on the surface of the windshield while clearing it with original equipment windshield wipers.

Another important object of the invention is to provide a windshield wiper accessory that does not obstruct the view of the operator of a vehicle and further, can be easily removed when the device is not needed.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a cross section elevation of a version of the device.

FIG. 4 is a representation of perspective view of a portion of the invention consisting of a version of a pair of blocks.

FIG. 4a shows another version of a block.

FIG. 5 is an elevation view of an example of the device in the 'lifted' configuration.

FIG. 6 demonstrates a partial perspective view emphasizing a version of the wiper blade profile.

FIG. 7 is a perspective view showing a version of a wiper blade attached to a wiper blade assembly.

FIG. 8 represents a partial perspective view of an example of a wiper blade assembly.

DETAILED DESCRIPTION OF THE PREFERRED EMBODIMENT

Figure 1:
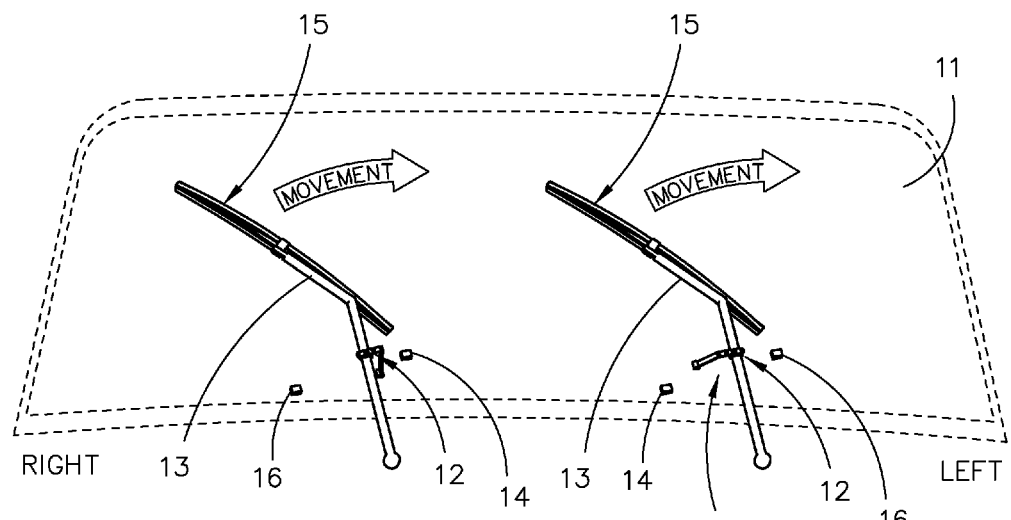
FIG. 1 represents a perspective view of the invention as it might be affixed to a windshield wiper over a windshield.

Referring now to the drawings, where the present invention (sometimes referred to as the device) is generally referred to with numeral 10, it can be observed that it basically includes a blade assembly 15, a lifter assembly 12, a block 14 and a block 16. A windshield 11 and wiper arm 13 are also shown.

The lifter assembly 12 includes sub-elements comprised of a vice 18, a jaw 20, a fastener 22, a fastener 24, a bracket 26, a hinge 28, an arm 30, a ski 32, an adjuster 34, a slot 36, a tab 38, a flange 40, a flange 42, a seat 44, a receiver 46 and a receiver 48.

The blade assembly 15 includes sub-elements comprised of a wiper blade 54, a tab 56, a face 58, an edge 60, a flange 62, a bracket 64, a tube 66, a nozzle 68, a coupler 70, a clip 72, struts 74 and a bracket 76.

FIG. 1 shows a basic variation of the device that includes a lifter assembly 12 affixed to both standard equipment wiper arms 13. Block 14 and block 16 are each independently affixed to the windshield 11 at specific predetermined locations. In this figure the wiper arms 13 are both shown ascending, moving from the right side of the windshield 11 to the left side. Note that in this configuration the blade assembly 15 on the left is in full contact with the windshield while the blade assembly 15 on the right is lifted off of the surface of the windshield.

Figure 2:
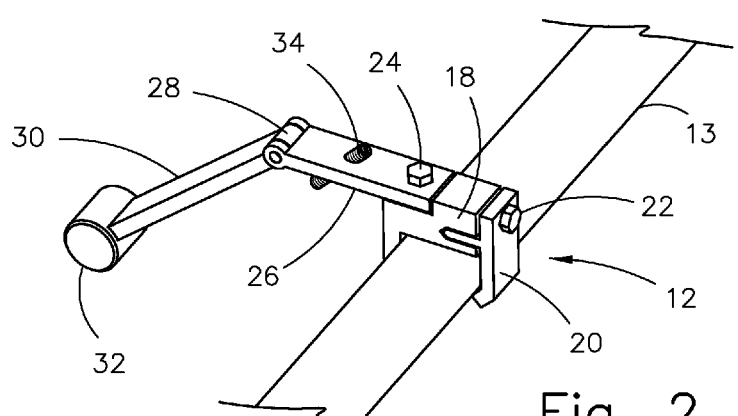
FIG. 2 shows a perspective view of a variation of the device.

Now looking at FIGS. 2 and 5 in combination, the lowered mode of the lifter assembly is demonstrated in FIG. 2 as evidenced by the arm 30 extending away from under the wiper arm 13. By contrast, FIG. 5 shows the raised mode where the arm 30 has been rotated at hinge 28 to be positioned under the wiper arm 13 so that the ski 32 contacts the windshield 11 and lifts the wiper arm 13 and thereby necessarily the blade assembly 15 away from the surface of the windshield 11.

FIG. 4 shows in more detail the block 14 and block 16 that include an adhesive 50 and an adhesive 52, respectively. The blocks 14 and 16 are adhered to the windshield 11 as demonstrated in FIG. 1 by means of the adhesive 50 and 52. The adhesive 50 and 52 provide for a semi-permanent mount of the blocks 50 and 52. Due to the relatively small size of the blocks 14 and 16, as well as their placement below the arced path of the blade assembly 15, they can generally remain affixed to the windshield. When no longer needed the blocks 14 and 16 might be pried off the windshield 11 with a razor blade or other such tool without damage to the windshield 11 itself.

Block 14 and block 16 may be configured in a form other than a block for some applications. For example, a sloped edge on one or more sides may be advantageous for allowing the ski 32 to be able to more easily traverse over the block such as demonstrated in FIG. 4a. Further, the height that the block 14 or 16 protrudes off of the windshield may be adjusted to affect the way that the ski 32 impacts the block. In yet another variation there may be more than one block 14 nearer the center of the windshield 11 to provide additional jarring effects as the lifted wiper arm 13 approaches the more center position.

Blocks 14 and 16 are directly positioned in the path of the arc on which the lifter assembly 12 travels when the wiper arms 13 are in motion. Therefore, the ski 32 strikes both of the blocks 14 and 16 along its arced path of travel. When the ski 32 strikes the blocks 14 and 16 the lifter assembly 12 converts from raised mode to lowered mode and then back again for each cycle of the wiper arm 13.

It should be apparent that when in motion the wiper arm 13 repeatedly cycles between pushing outboard and returning to the center. When operating normally, the wiper arms 13 on both the driver's side and passengers side of the windshield 11 rest at the bottom of the windshield when off. It should be noted that when off and at rest the passenger side wiper arm 13 is fully outboard and the driver's side wiper arm 13 is fully center.

Most windshield wiper arms 13 are held against the windshield 11 with a predetermined measure of force by means of a factory supplied spring (not shown in the figures). Often this spring is affixed between the wiper arm 13 and near where the wiper arm 13 intersects with the motor that powers the movement of the wiper arms 13. For some variations of the invention it may be necessary to utilize a stronger or weaker means to bias the wiper arm 13 against the windshield. For example, using a wide wiper blade 54 or for use with viscous mud may perform better with a stronger spring holding the blade assembly 15 against the windshield.

In many vehicles, each of the pair of standard wiper arms 13 move simultaneously in the same direction as the other, remaining substantially parallel. In other words, when the driver's side wiper arm 13 is moving outboard, toward the left then the passenger's side wiper arm is moving center, towards the left. Other vehicles use a single wiper arm 13 to clear the entire windshield 11 that oscillates between left and right. Yet other vehicles use a pair of wiper arms 13 that oscillate opposite each other in a pattern other than remaining parallel to each other. For example, when the driver's side wiper arm 13 is sweeping from center to outboard then the passenger side wiper arm 13 momentarily is near the most outboard position and when the driver's side wiper arm 13 is nearest the outboard edge of the windshield 11 then the passenger side sweeps toward the center of the windshield 11.

Then it can be appreciated that the pair of wiper arms 13 (one on the driver's side, the other in front of the passenger) can work in concert to clear the windshield 11. When the invention is operating normally, the blade assemblies 15 are only in contact with the windshield 11 when moving from the center to the outboard position. While returning to the center each blade assembly 13 is slightly raised from the surface of the windshield 11 to avoid pushing any debris towards the center of the windshield 11 or smearing any debris on the windshield.

The present invention is particularly adapted to use on vehicle windshield wipers that repetitively cycle through arcs centered about the axis of a wiper arm motor. In many applications one end of the wiper arm 13 is affixed to a wiper arm motor (or mechanically linked to a wiper arm motor) while the other end is affixed to a blade assembly 15. As the wiper arm 13 moves in oscillating arcs, the lifter assembly 12 affixed to the wiper arm 13 is carried along in concentric arcs. Block 14 and block 16 are affixed to the windshield 11 in the path of the arc of the lifter assembly 12 so that the ski 32 strikes the block 14 and block 16 at predetermined points along the movement of the wiper arm 13.

When the wiper arm 13 is at the center most position of the windshield 11 the ski 32 is between the wiper arm 13 and the windshield 11 thereby holding the blade assembly 15 off of the windshield 11 at a predetermined distance. As the wiper arm 13 moves in its cycle from the center most position of the windshield 11 towards the outboard edge the ski 32 strikes the block 14 and the ski 32 briefly catches the block 14 while the blade assembly 15 continues moving toward the outboard edge of the windshield. The arm 30, directly affixed to the ski 32, is pulled out from under the wiper arm 13 about the hinge 28 and thereby no longer holds the blade assembly 15 off of the windshield. The blade assembly 15 is then in contact with the windshield 11 as it moves from the center of the windshield 11 towards the outboard edge, pushing any debris on the windshield 11 towards the outboard edge. Continuing movement towards the outboard edge, the ski 32 strikes and travels over block 16 by moving about hinge 28. Because the ski 32 and arm 30 are not between the windshield 11 and wiper arm 13, and the arm 30 can freely move about hinge 28, the wiper arm 13 is not significantly lifted off of the windshield 11. As the wiper arm 13 and blade assembly 15 reach the most outboard position in the cycle of movement any debris pushed by the blade assembly 13 is cast off the outboard edge of the windshield 11 and away from the vehicle.

It is important that the blade assembly 15 is lifted slightly off of the windshield 11 during the blade assembly's 15 cyclic travel from the outboard edge of the windshield 11 towards the center so that any debris on the windshield 11 is not pushed toward the center of the windshield 11. This aids in rapid removal of debris from the windshield 11 surface and also reduces smearing on the windshield 11. This combination greatly increases visibility through the windshield 11.

When the wiper arm 13 is at the farthest position outboard the blade assembly 15 is in contact with the surface of the windshield. As it continues through it's cycle, moving from the outboard edge of the windshield 11 toward the center, the ski 32 strikes block 16 and momentarily catches on block 16 as the wiper arm 13 continues toward the center of the windshield 11 over the area of the windshield 11 that the vehicle occupants primarily view through. This forces the ski 32 and arm 30 to rotate about hinge 28 under the wiper arm 13 thereby lifting the blade assembly 15 off of the surface of the windshield 11. Immediately after the ski 32 and arm 30 rotate under the wiper arm 13 the ski 32 is pulled over the block 16 and continues across the windshield 11 toward the center in its raised configuration. As the wiper arm 13 continues in its cycle toward the center of the windshield 11 the ski 32 strikes block 14 and is further jolted off of the windshield 11 about the same distance as the thickness of the block 14. As the ski 32 passes over the block 14 the ski 32 and wiper arm 13 rapidly snap down against the windshield 11 thereby shaking off any debris from the blade assembly 15 shortly before the wiper arm 13 reaches its most center position. In it's cycle, the wiper arm 13 then reaches the most center position in its cycle and then reverses direction towards the outboard edge of the windshield 11 where the pattern repeats.

In other words, when the blade assembly 15 traverses from the center of the windshield 11 the ski 32 bumps block 14 causing the ski 32 and necessarily the arm 30 to be pulled out from under the wiper arm 13 so that the wiper arm 13 contacts and clears the windshield 11. As the ski 32 and arm 30 approach the lateral edge of the windshield 11 the ski 32 and arm 30 are pulled over block 16 and are rotated about hinge 28 without affecting the contact between the windshield 11 and the wiper arm 13. As the wiper arm 13 reaches its most lateral point it reverses direction and the ski 32 briefly catches on block 16 where it is forced between the wiper arm 13 and the windshield 11 thereby lifting the wiper arm 13 and necessarily the blade assembly 15 away from contacting the windshield 11. As the wiper arm 13 approaches the center most position in the cycle the ski 32 bumps over block 14 and shakes any debris from the blade assembly 15. The wiper arm 13 then reached the centermost position in its arc and reverses course thereby repeating the cycle.

In application where there is not an easily defined center of the windshield 11 the cycle along the arc of movement of the wiper arm 13 can be described as starting from a first extreme of arc path where the ski 32 and arm 30 are between the wiper arm 13 and windshield 11 thereby lifting the blade assembly 15 off of the windshield. As the wiper arm 13 moves toward an opposite, second extreme of the arc path the ski 32 strikes block 14 which kicks the ski 34 out from between the windshield 11 and wiper arm 13 allowing the blade assembly 15 to contact the windshield 11 and scrape debris towards the second extreme of the arc path. As the wiper arm 13 approaches the second extreme of the arc path the ski 32 bumps over block 16 not significantly affecting the contact between the windshield 11 and the blade assembly 15. After reaching the second extreme of the arc path the wiper arm 13 reverses course back toward the first extreme of arc path when the ski 32 strikes the block 16. The ski 32 and arm 30 are then forced between the wiper arm 13 and windshield 11 causing the blade assembly 15 to lift off of the windshield 11 a predetermined distance. The blade assembly 15 then remains from contacting the windshield 11 throughout its arced path towards the first extreme of the arc path. Shortly prior to arriving at the first extreme of the arc path the ski 32 contacts and bumps over block 14 thereby jarring loose any debris accumulated on the blade assembly 15. The oscillating cycle then repeats indefinitely until the invention is turned off.

FIG. 2 shows the lifter assembly 12 attached to a wiper arm 13 as it would be in use allowing the blade assembly 15 to contact the windshield. It should be noted that the ski 32 and arm 30 are away from under the wiper arm 13.

FIG. 3, when read in conjunction with FIG. 5, show in more detail the sub-components of the lifter assembly 12 in more detail. Generally, the lifter assembly 12 is preferably easily installed and removed from the wiper arm 13 on a vehicle.

During a typical installation jaw 20 and vice 18 are placed on either side of a wiper arm 13. Jaw 20 and vice 18 are drawn together by tightening fastener 22 into receiver 48 so that jaw 20 and vice 18 grip the wiper arm 13 securely. In a preferred variation receiver 48 is tapped to match threads on fastener 22. For ease of installation fastener 22 may have a commonly sized hex head, screw driver interface, wing-nut type handles, hex key receiver or other available type of driving means. Tab 38 is optionally provided to engage into slot 36 to aid in aligning the sub-components to facilitate easier assembly. Flange 40 and flange 42 are optionally provided to improve the grip of the lifter assembly 12 onto a wiper arm 13 by surrounding the wiper arm 13 on all sides thereby preventing the disengagement of the wiper arm 13 from the jaw 20 and vice 18 during demanding operation and extreme conditions.

It should be appreciated that the lifter assembly 12 may be designed to accommodate a range of various sized wiper arms 13. An alternate jaw 20 may also be provided that is dimensioned to engage into vice 18 for larger or smaller wiper arms 13.

In a preferred version the bracket 26 is affixed to vice 18 by means of a fastener 24 that when tightened holds firmly the bracket 26 to the vice 18 at seat 44. Receiver 46 is tapped to match threads on fastener 24. For ease of installation fastener 24 may have a commonly sized hex head, screw driver interface, wing-nut type handles, hex key receiver or other available type of driving means.

FIG. 5 shows a similar embodiment of the device with fastener 22 and fastener 24 both firmly seated thereby rigidly affixed to the wiper arm 13. This figure also shows the device as it is configured in its lifted mode where the ski 32 and arm 30 are between the wiper arm 32 and windshield 11 (as shown in FIG. 1) thereby lifting the wiper arm 13 off of the windshield 11.

FIG. 5 also demonstrates an optional adjuster 34. In an important version the adjuster is threaded and engages into a tapped aperture in the bracket 26. The adjuster 34 acts as a stop to limit the range that the arm 30 can rotate about hinge 28. Adjuster 34 allows the angle between the arm 30 and bracket 26 to be specifically selected when the device is in its lifted mode. By adjusting this angle the distance that the wiper arm 13, and thereby the blade assembly 15, is held off of the windshield can be easily adjusted as needed for varying conditions.

Various materials have been contemplated for the several components of the invention. These are provided only as enabling examples and should not be construed to be limiting. Generally, a rigid, durable and non-corrosive material is preferred. Materials could include, for example, metal, carbon fiber, medium or high density synthetics or other available materials. In an important version the ski 32 is made of a non-marring material that will not damage the glass of the windshield that may include rubber, plastic or other similar material.

In yet another variation the ski 32 may take the form of a wheel (not shown in the drawings) that is rotatable about an axle at the end of the arm 30 opposite the hinge 28. Other polygonal or multi-faceted profiles may also be more or less effective at avoiding damage to the windshield 11, retaining sufficient durability and for proper functioning engagement of the ski 32 with the block 14 and block 16. In another version the ski 32 may resemble the form of a roller or ball bearing.

FIG. 6 shows a preferred profile of a wiper blade 54. A typical vehicular wiper blade acts as a flexible edged squeegee and is somewhat effective in rain. However, for more viscous windshield debris such as mud, snow, sleet and others a more robust design is preferred. Additionally, as common windshield wipers are used bi-directionally, they lack the ability to fully realize the performance that can be achieved by the present invention that removes windshield debris in a single direction: outboard of the windshield.

The tab 56 is provided to engage into the bracket 76, shown in FIG. 7, to secure the wiper blade 54 to the balance of the blade assembly 15. The tab 56 feature allows for easier installation and replacement of a worn out wiper blade 54. A flange 62 is optionally provided along the length of the windshield-contacting edge 60 to act as a secondary means to clear the windshield 11 in a squeegee-like action.

A primary distinguishing feature of the wiper blade 54 is the face 58. The face 58 preferably has a concave face profile similar to that found on a bulldozer blade. The face 58 is directed to the outboard edge of the windshield so that when the blade assembly 15 is scraping the windshield in it's lowered position while moving from the center to the outboard edge, the face 58 is the leading edge. Any debris on the windshield 11 is collected on face 58 and pushed away from the area of the windshield 11 needed to be clear for improved visibility.

FIG. 7 shows in more detail an example of a bracket 64 that is the interface between the wiper arm 13 and the blade assembly 15. Generally, the bracket 64 allows a rapid and tool free means to install or remove the blade assembly 15 from the wiper arm 13. Struts 74 aid in applying even pressure of the blade assembly 15 onto the surface of the windshield 11 by spreading out the force evenly.

Many vehicles have a fluid reservoir and pump to squirt a cleaning fluid onto the windshield to aid in rinsing off debris. FIGS. 7 and 8 demonstrate an optional accessory to aid in more precisely directing the flow of cleaning fluid onto the windshield 11. A coupler 70 is provided to connect the existing washer fluid hose to a tube 66. Fluid is transmitted via the tube 66 to a nozzle 68 where the fluid is dispensed on the face 58 of the wiper blade 54. A clip 72 is provided to attach the tube 66 to the blade assembly 15. The supplied nozzle 68 may have a predetermined spray pattern to apply the washing fluid in the most beneficial direction and with the proper amount of force.

The invention can also be fairly characterized as a windshield wiper accessory comprising a lifter assembly, a first block and a second block. The lifter assembly has of a vice (with a jaw adapted to attach to the wiper arm) and a lifter arm. The windshield wiper arm has a windshield wiper blade held against a windshield with a spring type device as is common in many vehicles. The windshield wiper arm oscillates in an arced range of motion over said windshield when turned on to clear the windshield of debris. The motion of said windshield wiper arm has a first radial terminus and a second radial terminus. For the driver's side of the vehicle one of the radial termini is near the edge of the windshield (the outboard edge) and the other termini nearer the center of the windshield. While said windshield wiper arm is oscillating, the lifter assembly moves along substantially an arced path, typically below the line of vision of the vehicle occupants. The lifter arm is hinged on one end connected to the vice allowing substantially perpendicular articulation relative to the windshield wiper arm. The lifter arm adapted to have a first articulated position where the end of said lifter arm opposite the hinge is positioned away from between the windshield and the windshield wiper arm thereby effectively allowing the wiper arm to hold the wiper blade against the windshield and clear the windshield. The lifter arm is also adapted to have a second articulated position end of the lifter arm opposite the hinge is positioned between the windshield and the windshield wiper arm thereby effectively lifting the wiper blade off of the windshield at a predetermined distance, typically about anywhere in the range from a quarter to a full inch. The first and second blocks are affixed to the windshield along the path of travel of the lifter arm so that the lifter arm strikes the blocks when the wiper arm cycles through its oscillations while clearing the windshield. When the windshield wiper arm oscillates from one side of the windshield to the other the second end of the lifter arm (opposite the hinge) strikes the first block thereby forcing the lifter arm out from between the windshield and the vice allowing the wiper blade to clear the windshield and then continues in the same direction where it then strikes the second block and passes over it. Then the windshield wiper arm reaches the radial terminus and reverses direction and oscillates in the opposite direction. Then the end of the lifter arm strikes the second block thereby forcing the end lifter arm into the second articulated position between the windshield wiper and the windshield thereby lifting the blade off the windshield. When the lifter strikes the first block and passes over it, remaining in the second articulated position where the blade is lifted off of the windshield. The cycle of the windshield wiper oscillation repeats as long as the operator of the vehicle chooses and the wiper blade successively scrapes the debris off the windshield as it moves towards the edge of the vehicle and returns to center while the blade is elevated off of the windshield.

An important variation includes that the windshield wiper blade has a concave face that leads said windshield wiper blade is in contact with said windshield. This creates a sort of bull dozer effect to push a greater amount of debris off the side of the vehicle.

Another important variation can be characterized in that a washer fluid nozzle is provided that integrates with an existing fluid supply means to aid in flushing the debris off the windshield and wiper blade.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A windshield wiper accessory comprising a lifter assembly, a first block and a second block;

Said lifter assembly having a vice and a lifter arm;

Said vice having a jaw configured to removably attach to a windshield wiper arm at a predetermined position on said windshield wiper arm;

Said windshield wiper arm having affixed to it a windshield wiper blade biased to be held against a windshield;

Said windshield wiper arm capable of oscillating in an arced range of motion over said windshield;

Said arced range of motion of said windshield wiper arm has a first radial terminus and a second radial terminus;

While said windshield wiper arm is oscillating, said lifter assembly moves along substantially an arced path;

Said lifter arm having a first end and a second end;

Said lifter arm on the first end is hingedly attached to the vice allowing substantially perpendicular articulation relative to said windshield wiper arm;

Said lifter arm adapted to have a first articulated position and a second articulated position;

Said first articulated position is characterized in that the second end of said lifter arm is positioned away from between the windshield and the windshield wiper arm thereby effectively allowing the wiper arm to hold the wiper blade against the windshield;

Said second articulated position is characterized in that the second end of said lifter arm is positioned between the windshield and the windshield wiper arm thereby effectively lifting the wiper blade off of the windshield at a predetermined distance;

Said first block is affixed to said windshield at a predetermined point on said arced path;

Said second block is affixed to said windshield at a predetermined point on said arced path;

When said windshield wiper arm oscillates from said first radial terminus towards said second radial terminus the second end of the lifter arm
 a) strikes the first block thereby forcing the lifter arm into said first articulated position and
 b) then strikes the second block and passes over it, remaining in the first articulated position When said windshield wiper arm oscillates from said second radial terminus towards the first radial terminus the second end of the lifter arm
 a) strikes the second block thereby forcing the lifter arm into the second articulated position and
 b) then strikes the first block and passes over it, remaining in the second articulated position.

2. A windshield wiper accessory as disclosed in claim 1, further characterized in that said windshield wiper blade has a concave face that leads said windshield wiper blade when it is in contact with said windshield.

3. A windshield wiper accessory as disclosed in claim 1, further characterized in that a washer fluid nozzle is provided that integrates with an existing fluid supply means and selectively dispenses a fluid stream along a leading edge of said wiper blade.

* * * * *